(12) United States Patent
Hopwood

(10) Patent No.: US 7,093,402 B2
(45) Date of Patent: *Aug. 22, 2006

(54) COUPLING DEVICE

(75) Inventor: Ian Hopwood, Sheffield (GB)

(73) Assignee: Ultimate Design Solutions Ltd., Sheffield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/974,492

(22) Filed: Oct. 27, 2004

(65) Prior Publication Data

US 2005/0072102 A1    Apr. 7, 2005

Related U.S. Application Data

(63) Continuation of application No. PCT/GB03/00415, filed on Nov. 13, 2003.

(30) Foreign Application Priority Data

May 1, 2002    (GB) .................................. 0209943.0
May 1, 2002    (GB) .................................. 0209944.8

(51) Int. Cl.
*B25G 3/34*    (2006.01)

(52) U.S. Cl. .................. 52/740.7; 52/726.1; 52/583.1; 403/305

(58) Field of Classification Search ............... 52/740.7, 52/726.1, 583.1, 584.1; 403/305, 362, 293, 403/292
See application file for complete search history.

(56) References Cited

U.S. PATENT DOCUMENTS

| 1,689,281 | A |   | 10/1928 | Forssell |
|---|---|---|---|---|
| 3,415,552 | A | * | 12/1968 | Howlett ...................... 403/305 |
| 3,551,999 | A |   | 1/1971 | Gutmann |
| 3,850,535 | A | * | 11/1974 | Howlett et al. ............. 403/305 |
| 4,408,926 | A |   | 10/1983 | Werner |
| 4,666,326 | A |   | 5/1987 | Hope |
| 5,046,878 | A |   | 9/1991 | Young |
| 5,152,118 | A | * | 10/1992 | Lancelot ..................... 52/726.1 |
| 5,193,932 | A |   | 3/1993 | Wu |
| 5,393,165 | A |   | 2/1995 | Rowan, Jr. |
| 5,419,217 | A | * | 5/1995 | Umezawa et al. ............. 74/567 |
| 5,664,902 | A | * | 9/1997 | Holdsworth ................. 403/362 |
| 5,909,980 | A | * | 6/1999 | Holdsworth ................. 403/362 |
| 5,967,691 | A | * | 10/1999 | Lancelot, III ............... 403/313 |
| 5,974,761 | A | * | 11/1999 | Mochizuki et al. ........ 52/740.1 |
| 6,109,619 | A | * | 8/2000 | Fine .............................. 279/83 |
| 6,202,282 | B1 |   | 3/2001 | Holdsworth |
| 6,532,711 | B1 | * | 3/2003 | Gregel et al. .............. 52/583.1 |
| 6,679,024 | B1 |   | 1/2004 | Dahl |

FOREIGN PATENT DOCUMENTS

| CH | 532 702 | 12/1970 |
|---|---|---|
| DE | 4 301 307 | 7/1994 |
| DE | 2 950 0727 | 1/1995 |
| EP | 0 348 060 | 6/1989 |

(Continued)

*Primary Examiner*—Carl D. Friedman
*Assistant Examiner*—Basil Katcheves
(74) *Attorney, Agent, or Firm*—Renner, Otto, Boisselle & Sklar, LLP

(57) ABSTRACT

A coupling device for coupling reinforcing bars used in structural concrete comprising an elongate tubular body for receiving bar end portions, a plurality of engagers being adjustably positioned through the elongate tubular body, the coupling device being characterized in that the plurality of engagers are configured with a plurality of different end portions being configured for a different engaging of the reinforcing bars.

40 Claims, 16 Drawing Sheets

FOREIGN PATENT DOCUMENTS

| | | |
|---|---|---|
| EP | 0 554 972 | 8/1993 |
| FR | 2 721 641 | 12/1995 |
| GB | 631 786 | 11/1947 |
| GB | 2 127 512 | 9/1983 |
| GB | 2 220 241 | 6/1989 |

* cited by examiner

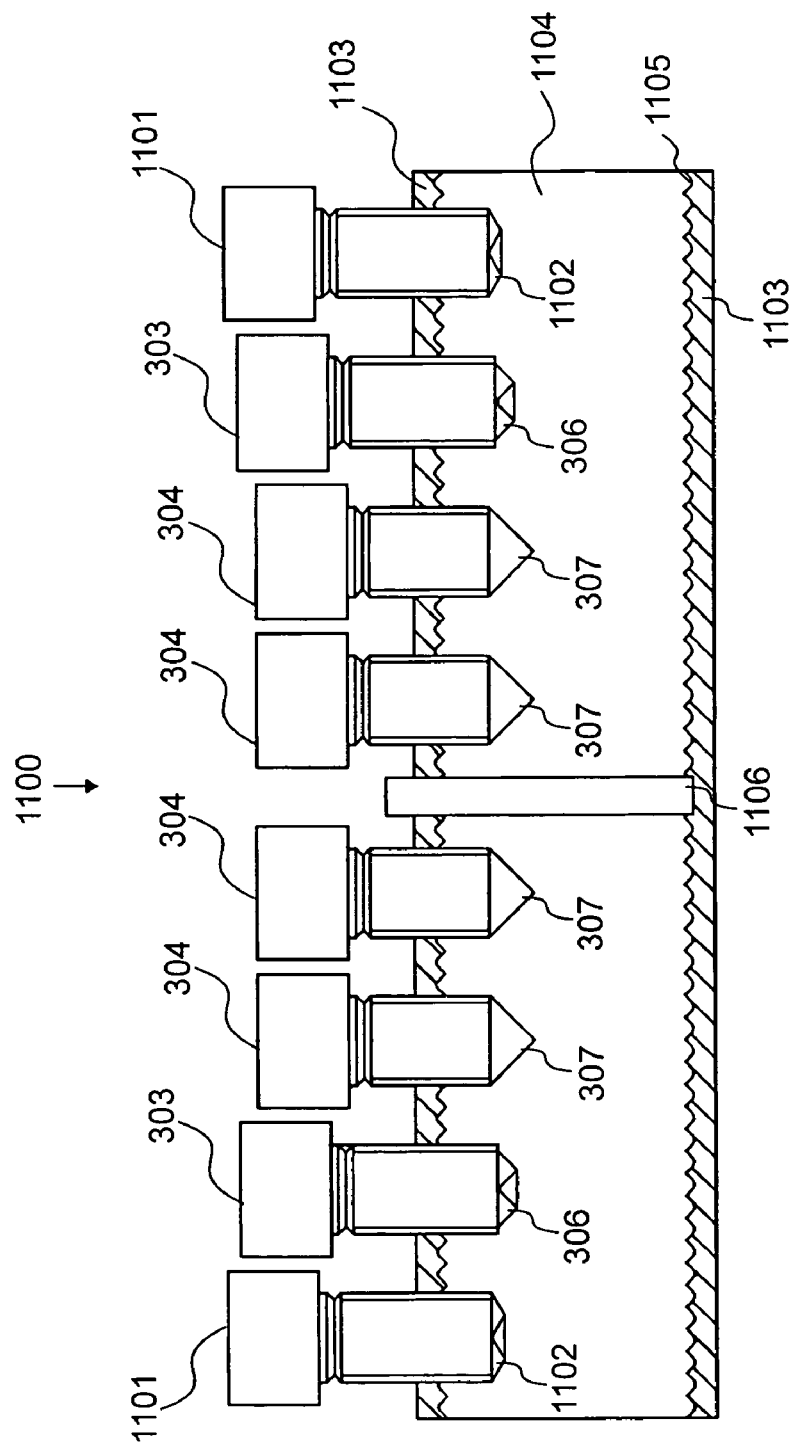

COUPLING DEVICE

This application is a continuation of International application Ser. No. PCT/GB03100415, filed Jan. 30, 2003, which was published in English as WO 03/093602, and which claims priority from GB 0209943.0 and GB 0209944.8, both of which were filed on May 1, 2002.

FIELD OF THE INVENTION

The present invention relates to the coupling of bars, wires and cables, in particular but not exclusively, to the coupling of reinforcing bars used in structural concrete.

BACKGROUND TO THE INVENTION

There exists within the art, apparatus and method for coupling reinforcing bars used in structural concrete, such coupling commonly involving the use of a tubular steel coupling body or sleeve configured to receive end portions of the reinforcing bars. Typically, the bars are held in place within the coupling body using a number of engagers, these being for example, bolts or screws which engage into the reinforcing bars thereby wedging the bars against an inner surface of the tubular body providing the couple.

Typical coupling devices found in the art generally comprise engagers having pointed end portions to achieve an engaging into the reinforcing bars and not an engaging onto an outer surface of the bars thereby providing established contact between coupling device and reinforcing bars in an attempt to provide a strong couple. Through the provision of engagers being bolts or screws configured with pointed end portions the coupled reinforcing bars are both wedged firmly against an inner surface of the tubular body in addition to providing resistance to a laterally applied loading force, or tensile force. In particular, EP 0554972, GB 2220241, U.S. Pat. No. 5,046,878, U.S. Pat. No. 5,909,980, U.S. Pat. No. 6,202,282 and U.S. Pat. No. 5,664,902 all disclose a coupling device comprising a plurality of engagers, each engager comprising a pointed or conical end portion configured for bar penetration. A typical coupling device as disclosed within these documents and found in the art is detailed in FIG. 1 herein. FIG. 1 herein illustrates a side elevation view of a bar coupling device 100 as disclosed in the art comprising an elongate tubular body 102, a plurality of engagers 103, at least one gripping surface 104 and an inner surface 105. As is common in the art, coupling device 100 is configured to receive reinforcing bars, in particular their end portions, 101 via elongate tubular body 102. Engagers 103 are then adjustably positioned through tubular body 102 thereby engaging into bars 101 which in turn provides a wedging of reinforcing bars 101 against internal surface 105 at for example a specific gripping surface 104.

An alternative approach for the provision of coupling reinforcing bars is disclosed in GB 2127512. This document discloses a coupling device comprising an elongate tubular body configured to receive bar end portions, the bars being engaged by a plurality of engagers, in the form of bolts configured with flat end portions for engaging onto an outer surface of the bars. A consequence of reduced interaction and contact between the coupling device and reinforcing bars, via the non-penetrating engagers, is a requirement for additional contact between coupling device and reinforcing bar so as to provide an adequate coupling strength. This is provided for in GB 2127512 in the form of a settable material as detailed with reference to FIGS. 1 and 2 therein. The settable material is introduced between the coupling device and the reinforcing bars whereby upon setting, coupling of the reinforcing bars is achieved.

The requirement for a settable material within the coupling device, to be introduced in situ, introduces numerous disadvantages. In particular, settable materials found in the art comprise low fire resistance introducing, in turn, safety concerns. Cementitious grout has been employed to overcome the problem of using low fire resistance material, however this in turn creates additional problems. As a result of the grout having high viscosity, air pockets or voids within the coupling region are observed resulting in a weak joint. The present invention described herein is directed, in general, although not exclusively, to a coupling device being operable without the requirement of a settable material, relying instead on the nature and construction of the coupling device to provide a strong couple. To this type of device we now turn.

With reference to the prior art coupling device of FIG. 1 herein; in response to a laterally applied loading force to the reinforcing bars 101, this loading force is transferred from bars 101 to the coupling device in gradually reducing magnitude from outer most regions 106 progressively through to inner most regions 107. Accordingly, the region of the bars 101 under the greatest stress, following the applied loading force, corresponds to the position of the outer most engager 108 as, in this region, a maximum transfer of loading force from bar 101 to coupling device 100 is observed. The amount of loading force transfer then progressively decreases towards the inner most regions of the coupling device 107, as detailed with reference to FIG. 1 herein.

Accordingly, the inventors have realized various disadvantages associated with prior art coupling devices involving a plurality of engagers configured to engage into the reinforcing bars thereby performing a wedging action. In particular, following a maximum loading force applied to the reinforcing bars 101 it is common to observe bar breakage 109 at a region of the bars 101 having reduced cross-sectional surface area in addition to maximum load transfer from bar to coupling device. Due to the degree of penetration of the engagers into the reinforcing bars, the ability of prior art coupling devices to transfer load from bar to coupler body up to and including the ultimate tensile strength of the reinforcing bars is reduced as a result of the reduced cross-sectional area of the bars at various points along the bars within the coupler body. Commonly, at and including the ultimate tensile strength of the bars, at least one bar breaks in a region within the coupler device therefore providing a weak joint between reinforcing bars. Consequently, the region of coupling of reinforcing bars using coupling devices found in the art, reduces the maximum loading force tolerance of the bars used in structural concrete. The coupling providing a weak point within any reinforced structure as a result of both the reduced cross-sectional area of the bars and a large initial load transfer from bar to coupling device. Moreover, bar breakage within the region of the coupler body even at nominal ultimate tensile strength of the bar is considered by some regulatory authorities as failure of the coupler.

What is required therefore is a coupling device configured for providing a strong couple between reinforcing bars up to and including the ultimate tensile strength of the reinforcing bars.

Accordingly, the inventors strive to provide a coupling device which will not represent a weak point within the reinforced structure providing instead a bar coupled region having an equal or higher loading force tolerance to that found at an uncoupled region along the length of the bars.

SUMMARY OF THE INVENTION

The inventors, on realizing the disadvantages associated with prior art coupling devices, provide a coupling device for coupling reinforcing bars, wires and cables, comprising, in part, a plurality of engagers being adjustably positioned through a tubular body, where the plurality of engagers are configured with a plurality of different end portions configured for a different engaging of the reinforcing bars. The different end portions may be configured to engage onto an outer surface of the reinforcing bars, to engage partially into the reinforcing bars and/or an engaging into the reinforcing bars providing, in turn, a range of reduced bar cross-sectional areas as a consequence of the amount of engager penetration. The amount of load transfer from bar to coupling device, via indirectly the different engagers, is also dependent upon the nature of the engager end portion. For example, the coupling device at a region having an engager configured for, substantially, non-penetration, engagers onto the bars, such that the device experiences a reduced amount of load transfer as compared to a region having an engager configured for bar penetration and an engaging into the reinforcing bars. Through the provision and positioning of a plurality of engagers configured with a plurality of different end portions extending longitudinally along the tubular body of the coupling device, bar breakage within the region of the coupling device is avoided up to and including the ultimate tensile strength of the reinforcing bars.

The problem of bar breakage within the region of the coupler body due to a reduced cross-sectional area of the bar resulting from engager penetration, is avoided through specific implementations of the present invention. In particular, engager penetration along the length of the coupling joint is controlled such that the cross-sectional area of the bars, within the coupler body, is not reduced beyond the bar's ability to take the load in the bar at that point. Effectively, load is progressively transferred from the reinforcing bars to the coupler body at every point of contact between bar and coupler body along the length of the coupling device.

According to a first aspect of the present invention there is provided a coupling device for coupling reinforcing bars used in structural concrete comprising:

an elongate tubular body for receiving end portions of said reinforcing bars;

a plurality of engagers being adjustably positioned through said tubular body;

said coupling device being characterized in that:

said plurality of engagers are configured with a plurality of different end portions for engaging said reinforcing bars;

wherein said different end portions are configured for a different engaging of said reinforcing bars.

According to one aspect of the present invention there is provided at least one engager of the plurality of engagers configured for an engaging onto the reinforcing bars, at least one engager of the plurality of engagers configured for an engaging into the reinforcing bars, and at least one engager of said plurality of engagers configured for an engaging partially into said reinforcing bars.

In particular, the plurality of different end portions comprise an end portion configured for an engaging onto the reinforcing bars, an end portion configured for an engaging partially into the reinforcing bars and an end portion configured for an engaging into the reinforcing bars.

Alternatively, wherein at least one engager of said plurality of engagers is configured for an engaging partially into said reinforcing bars and at least one engager of said plurality of engagers is configured for an engaging into said reinforcing bars.

Alternatively, wherein said plurality of different end portions comprise:

a first type of end portion configured for an engaging partially into said reinforcing bars and;

a second type of end portion configured for an engaging into said reinforcing bars.

Alternatively, wherein said plurality of different end portions further comprise:

a third type of end portion configured for an engaging onto said reinforcing bars.

Alternatively, wherein said plurality of engagers further comprise:

a fourth type of end portion configured for an engaging partially into said reinforcing bars;

wherein said engaging partially into said reinforcing bars by said fourth type of end portion comprises a penetration of said reinforcing bars being less than a penetration of said reinforcing bars by said first type of end portion.

Alternatively, wherein at least one engager of said plurality of engagers configured for engaging partially into said reinforcing bars is positioned at an outer most region along a length of said elongate tubular body and;

at least one engager of said plurality of engagers configured for engaging into said reinforcing bars is positioned at an inner most region along a length of said elongate tubular body.

Alternatively, wherein at least one engager of said plurality of engagers configured of engaging onto said reinforcing bars is positioned at an outer most region along a length of elongate tubular body.

As such, due to the nature and relative positioning of the plurality of engagers configured with a plurality of different end portions, the amount of load transfer from reinforcing bars to coupling device is more uniform along the length of the device compared to that found in the art. Accordingly, a coupling device is described herein which avoids bar breakage within the region of the coupling device being achieved by controlled engager-bar penetration along the length of the reinforcing bars such that at any point along the reinforcing bars within the coupling device, the cross-sectional area of the bars is not reduced to an extent where load transfer from bar to coupler body is not achieved.

Preferably, said plurality of engagers comprise a plurality of shear bands, said shear bands comprising a plurality of different diameters; wherein an engaging of said reinforcing bars by said plurality of engagers is controlled using said plurality of shear bands.

According to a further aspect of the present invention the plurality of holes are threaded holes configured for receiving screw threads, the plurality of engagers also being configured with screw threads such that the engagers are configured for adjustable positioning in the threaded holes.

According to a further aspect of the present invention the plurality of engagers and/or the plurality of different end portions have a hardness greater than that of the reinforcing bars. As such, penetration of the reinforcing bars, if required, is obtainable.

According to a further aspect of the present invention the coupling device comprises at least one face extending longitudinally on an inner surface of the tubular body and at least one recessed gripping surface being formed on the at least one face and extending longitudinally on at least one face wherein the at least one recessed gripping surface is configured to grip the reinforcing bars in response to an engaging of the reinforcing bars by the plurality of engagers. The provision of at least one recessed gripping surface allows the reinforcing bars to be seated correctly within the coupling device and serves to provide an extended area of contact between coupler and the reinforcing bars.

According to a further aspect of the present invention the at least one recessed gripping surface comprises a plurality of teeth, the teeth being configured to engage the reinforcing bars in response to an engaging of the reinforcing bars by the plurality of engager. As such, appreciable bar slip within the coupling device is avoided through utilization of both the plurality of engagers configured with a plurality of different end portions and at least one recessed gripping surface optionally comprising a plurality of teeth. According to the specific implementations of the present invention both bar breakage within the region of the coupler body is not observed up to and including the ultimate tensile strength of the reinforcing bars. Additionally, appreciable bar slip within the coupling device is not observed up to the yield strength of the bar.

According to a yet further aspect of the present invention the coupling device may comprise a pentagonal cross-sectional configuration wherein the elongate tubular body comprises five faces extending longitudinally on the inner surface of the tubular body and at least one recessed gripping surface being formed on at least one of the five faces. Alternatively, the coupling device may comprise a substantially circular cross-sectional configuration wherein the elongate tubular body comprises at least one face extending longitudinally on an inner surface of the tubular body and at least one recessed gripping surface being formed on at least one face and extending longitudinally on the face.

As will be evident to the person skilled in the art, the coupling device as described herein is configurable for use in the coupling of cables, wires, bars or the like both used within the field of structural concrete and any type of use not limited to use within structural concrete.

The elongate tubular body may be described as a sleeve-like body or receiving body configured for positioning over and about the bars, wires or cables so as to provide a coupling joint. Additionally, means for engaging the bars, wires or cable may comprise a plurality of engagers as described herein or alternatively any form or engager may be employed so as to provide a means for wedging the bars, wires or cables against the recessed gripping surface (alternatively termed a recessed wedging surface). For example, the means for engaging may comprise a form of engager being adjustably positioned onto, partially into the bars, wires or cables so as to wedge, press or abut the same against the recessed gripping surface.

According to a further aspect of the present invention there is provided a coupling device comprising:
an elongate tubular body for receiving end portions of reinforcing bars;
a plurality of engagers being adjustably positioned through a side wall of said tubular body;
said coupling device being characterized in that:
said plurality of engagers are configured with a plurality of different end portions for engaging said reinforcing bars;
wherein said different end portions are configured for a different engaging of said reinforcing bars.

According to a further aspect of the present invention there is provided a coupling device for coupling reinforced bars used in structural concrete comprising:
a sleeve-like body for receiving reinforcing bars;
a plurality of engagers being adjustably positioned through said sleeve-like body;
said coupling device being characterized in that:
at least one of said plurality of engagers comprises a first type of end portion configured for a first type of engaging of said reinforcing bars and;
at least one of said plurality of engagers comprises a second type of end portion configured for a second type of engaging of said reinforcing bars.

Alternatively, wherein at least one engager of said plurality of engagers comprises a third type of end portion configured for a third type of engaging of said reinforcing bars.

Alternatively, wherein at least one engager of said plurality of engagers comprises a fourth type of end portion configured for a fourth type of engaging of said reinforcing bars.

Alternatively, wherein said first type of engaging by said first type of end portion comprises an engaging partially into said reinforcing bars and;
said second type of engaging by said second type of end portion comprises an engaging into said reinforcing bars.

Alternatively, wherein said third type of engaging by said third type of end portion comprises an engaging onto said reinforcing bars and;
said fourth type of engaging by said fourth type of end portion comprises an engaging partially into said reinforcing bars;
wherein said engaging partially into said reinforcing bars by said fourth type of end portion comprises a penetration of said reinforcing bars being less than a penetration of said reinforcing bars by said first type of end portion.

According to a further aspect of the present invention there is provided a coupling device for coupling reinforcing bars used in structural concrete comprising:
an elongate tubular body for receiving end portions of said reinforcing bars;
a plurality of longitudinally spaced holes within said tubular body,
a plurality of engagers being adjustably positioned in said holes, said engagers being positioned through said tubular body and;
said coupling device being characterized in that:
said plurality of engagers are configured with a plurality of different end portions for engaging said reinforcing bars;
wherein said different end portions are configured for a different engaging of said reinforcing bars.

According to a further aspect of the present invention there is provided a coupling device for making joints in bars or wires for structural concrete comprising:
a sleeve-like body for locating over and about portions of said bars or wires;
a plurality of engagers positioned though said sleeve-like body, said engagers being positively adjustable through said sleeve-like body;
said coupling device being characterized in that:
said plurality of engagers are different engagers for a different engaging of said bars or wires.

According to a further aspect of the present invention there is provided a coupling device for coupling or joining bars or wires comprising:
a sleeve-like body for receiving bars or wires;
a plurality of engagers having end portions being positioned at an inner surface of said sleeve-like body;
said coupling device being characterized in that:
said plurality of engagers are configured for a different engaging of said bars or wires.

According to a further aspect of the present invention there is provided a coupling device for coupling reinforcing bars used in structural concrete comprising:

an elongate tubular body for receiving end portions of said reinforcing bars;

at least one face extending longitudinally on an inner surface of said tubular body;

at least one gripping surface being formed on said at least one face and extending longitudinally on said at least one face;

means to grip said reinforcing bars, said means to grip being formed on said gripping surface;

said coupling device further comprising and being characterized by:

a plurality of engagers being adjustably positioned through said tubular body;

wherein said at least one gripping surface is configured to grip said reinforcing bars in response to an engaging of said reinforcing bars by said plurality of engagers.

According to a further aspect of the present invention there is provided a coupling device comprising:

an elongate tubular body for receiving end portions of reinforcing bars;

at least one face extending longitudinally on an inner surface of said tubular body;

at least one gripping surface being formed on said at least one face and extending longitudinally on said at least one face;

means to grip said reinforcing bars, said means to grip being formed on said gripping surface;

said coupling device further comprising and being characterized by:

a plurality of engagers being adjustably positioned through said tubular body;

wherein said at least one gripping surface is configured to grip reinforcing bars in response to an engaging of said reinforcing bars by said plurality of engagers.

According to a further aspect of the present invention there is provided a coupling device for making joints in bars or cables comprising:

a sleeve-like body for locating over and about portions of said bars or cables;

at least one face extending longitudinally on an inner surface of said sleeve-like body;

at least one gripping surface being formed on said at least one face and extending longitudinally on said at least one face;

means to grip being formed on said at least one gripping surface, said means to grip being configured to grip said bars or cables;

said coupling device further comprising and being characterized by:

a plurality of engagers being adjustably positioned at said inner surface;

wherein said means to grip is configured to grip said bars or cables in response to an engaging of said bars or cables by said plurality of engagers.

According to a further aspect of the present invention there is provided a coupling device for coupling reinforcing bars comprising:

a sleeve-like body for receiving portions of said reinforcing bars;

at least one gripping surface extending longitudinally on an inner surface of said sleeve-like body;

screw threads being formed on said gripping surface;

said coupling device further comprising and being characterized by:

a plurality of engagers for engaging said reinforcing bars;

wherein said screw threads are configured to grip said reinforcing bars in response to an engaging of said reinforcing bars by said plurality of engagers.

According to a further aspect of the present invention there is provided a method of coupling reinforcing bars used in structural concrete comprising the steps of:

receiving end portions of said reinforcing bars in an elongate tubular body;

adjustably positioning a plurality of engagers through said tubular body;

said method being characterized by the steps of:

engaging said reinforcing bars with a plurality of different end portions of said plurality of engagers, said different end portions being configured for a different engaging of said reinforcing bars and;

coupling said reinforcing bars by said different engaging of said reinforcing bars by said different end portions.

According to one specific implementation of the present invention, at least one end portion comprises a substantially flat region configured for near zero bar penetration. At least one end portion may comprise a truncated pointed region configured for a partial penetration into the reinforcing bars. And, at least one end portion may comprise a pointed region configured for bar penetration. It will be appreciated by those in the art, that a variety of specific types of end portions exist permitting in turn near zero, partial and full bar penetration. Such variety of different bar end portions configured for near zero, partial and full bar penetration are encompassed herein.

According to the specific implementations of the present invention a coupling device is provided having a shorter length and diameter to those of prior art coupling devices. Due to a more compact coupling device configuration, a wall thickness of the elongate tubular body maybe provided which is larger than those found in the art resulting in greater engager screw thread—tubular body screw thread interaction. Additionally, the plurality of engagers are configurable to be positioned closely to one another along the length of the elongate tubular body. The engagers may comprise an engager head configured with a recessed portion to interface with an engager tightening device or may have a hexagonal or other geometrically shaped head cross-section to interface with a spanner like tightening device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 11a illustrates a cross-sectional side elevation view of the coupling device according to a further specific implementation of the present invention;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 2:
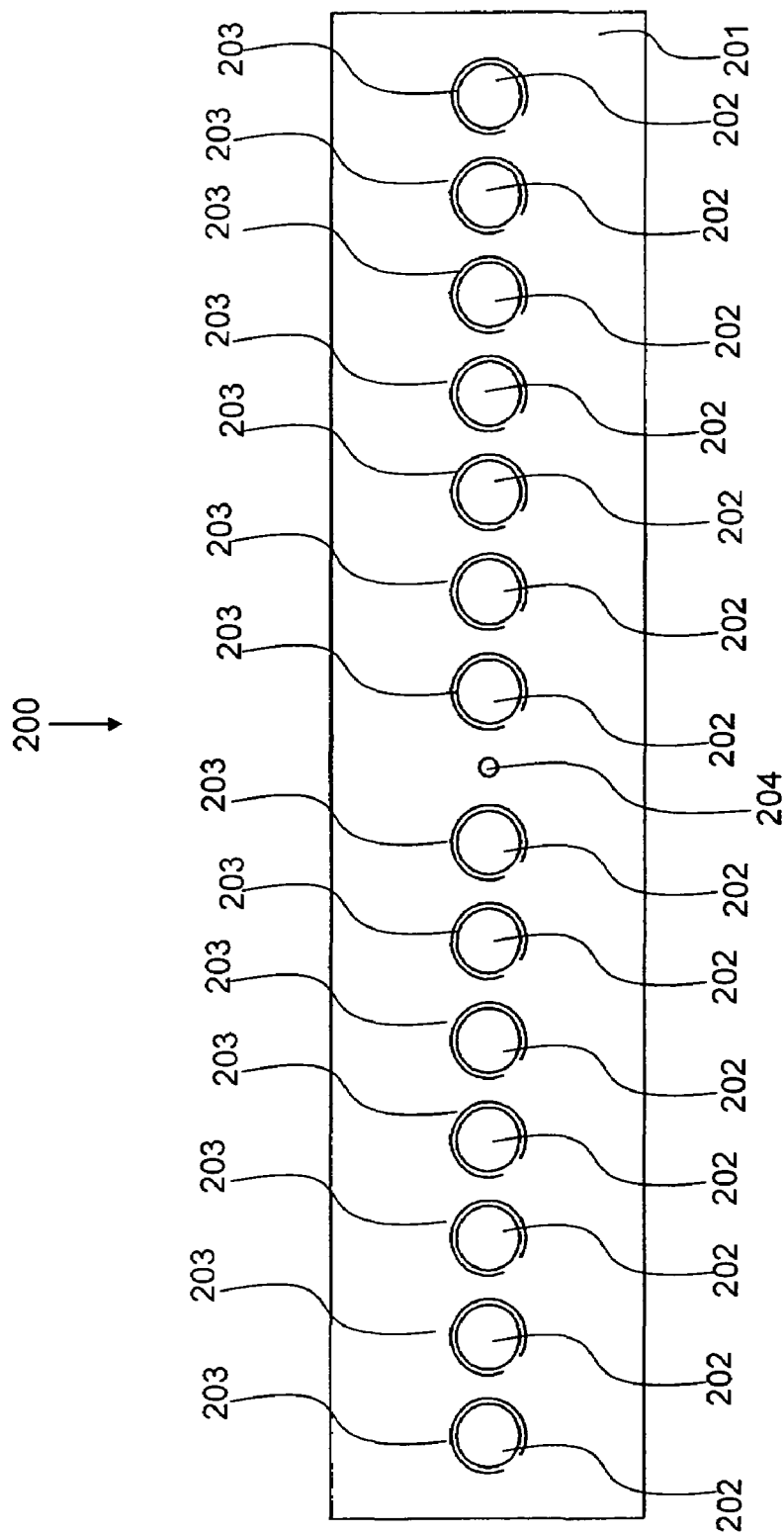
FIG. 2 illustrates a plan view of the coupling device tubular body according to a specific implementation of the present invention.

Referring to FIG. 2 herein there is illustrated a plan view of the bar coupling device according to the specific implementation of the present invention. The coupling device 200 comprises an elongate tubular body 201, a plurality of longitudinally spaced holes 202 and a centrally located hole 204, according to the specific implementation of the present invention. The elongate tubular body 201 is manufactured from a steel or similar material and comprises a sufficient thickness to enable a secure coupling of reinforcing bars. Through the elongate tubular body 201 there are provided a plurality of longitudinally spaced holes 202 being of a diameter to allow a bolt, pin, rivet or screw to be positioned within each hole 202 so as to interface with an interior of the elongate tubular body 201.

According to the specific implementation of the present invention each of the longitudinally spaced holes 202 are provided with screw threads 203 being configured to engage with corresponding screw threads of an engager being by way of example an engaging bolt or screw.

Positioned centrally along the elongate tubular body 201 is provided hole 204 being configured to allow removable insertion of a pin, which when positioned centrally within said elongate tubular body extends through an inner surface of the tubular body 201.

Figure 3:
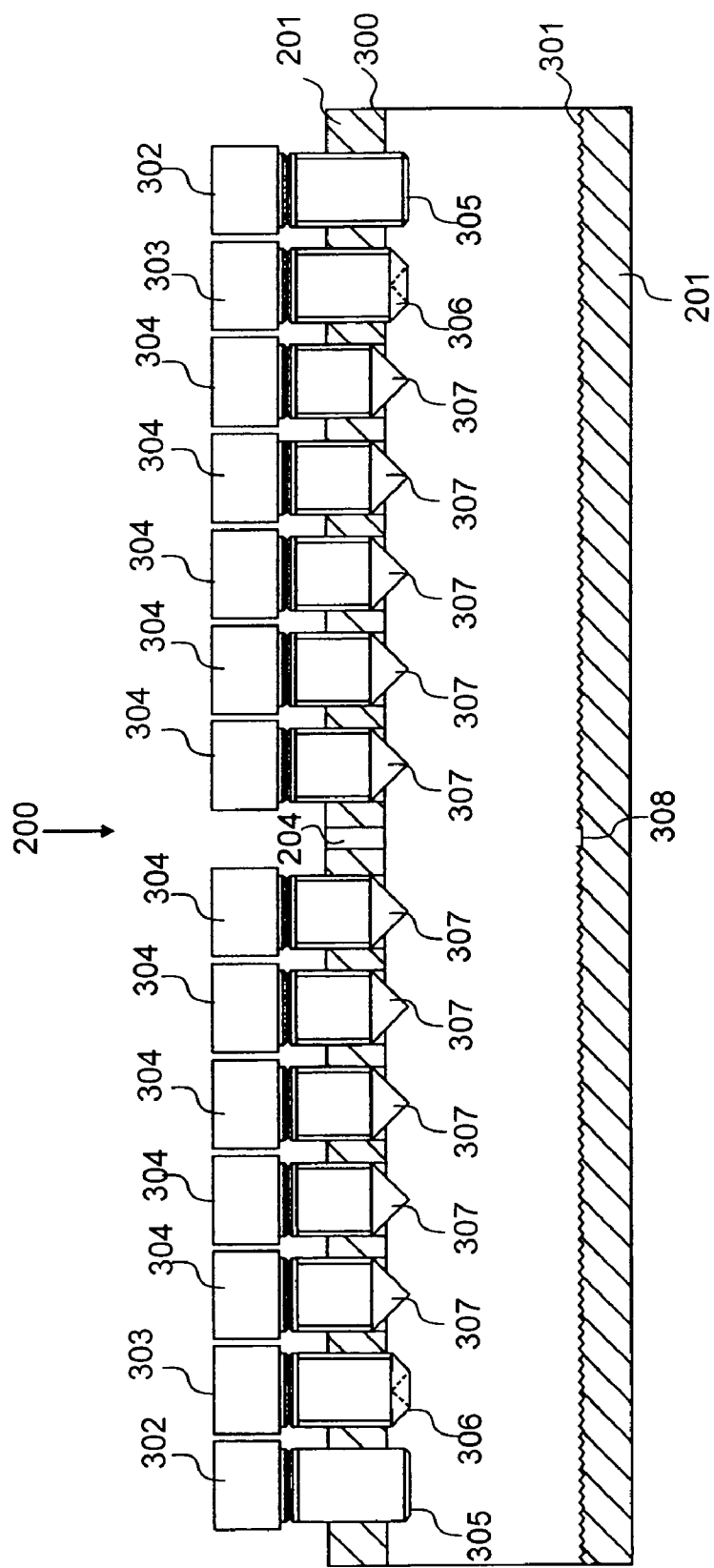
FIG. 3 illustrates a cross-sectional side elevation view of the coupling device according to a specific implementation of the present invention.

In referring to FIG. 3 herein there is illustrated a cross-sectional side elevation view of the coupling device according to the specific implementation of the present invention. Coupling device 200 is illustrated comprising the elongate tubular body 201; an inner surface 300; at least one recessed gripping surface 301; and a plurality of engagers 302, 303 and 304. Adjustably positioned within the plurality of longitudinally spaced holes 203 are engagers 302, 303 and 304 being configured for a different engaging of the reinforcing bars to be coupled 101.

As is common to coupling devices found in the art, end portions of the reinforcing bars are received at the inner surface 300 of tubular body 201 whereby engagers 302, 303 and 304 are adjustably positioned to engage the reinforcing bars, in particular their end portions. According to the specific implementation of the present invention the plurality of engagers 302, 303 and 304 comprise different end portions 305, 306 and 307, such that these end portions are configured for a different engaging of the reinforcing bars. In particular, end portions 305 are configured to engage onto the reinforcing bars, end portions 306 are configured for engaging partially into the reinforcing bars while end portions 307 are configured for and engaging or substantially into the reinforcing bars to a greater extent than engager 303 having end portion 306. According to the specific implementation of the present invention end portions 305, 306 and 307 are configured with a hardness greater than that of the reinforcing bars, in particular their end portions.

According to further specific implementations of the present invention positively adjustable engagers 302, 303 and 304 comprise bolts, screws, pins or rivets configured with different end portions for a different engaging of the reinforcing bars.

According to the specific implementation of the present invention the elongate tubular body 201 is provided with at least one recessed gripping surface 301 being formed on at least one face of inner surface 300, recessed gripping surface 301 extending longitudinally on the face and elongate tubular body 201. Recessed gripping surface 301 is configured to grip the reinforcing bars, in particular their end portions, in response to an engaging of the reinforcing bars by the plurality of engagers 302, 303 and 304, in particular their end portions 305, 306 and 307 according to the specific implementation of the present invention.

The centrally located pin is provided through hole 204, passing through inner surface 300 and tubular body 201 to seat at a central point within tubular body 201 at 308.

Figure 4:
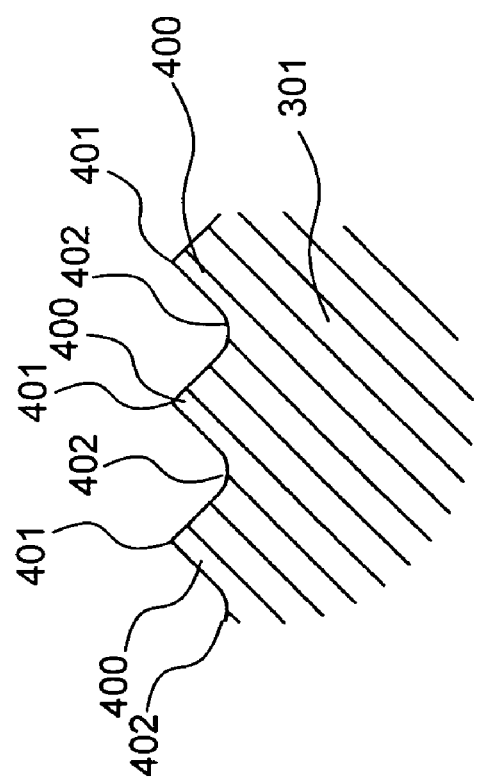
FIG. 4 illustrates a cross-sectional side elevation view of the teeth being formed on at least one recessed gripping surface of the coupling device according to one aspect of the present invention.

Referring to FIG. 4 herein there is illustrated a cross-sectional side elevation view of a section of at least one recessed gripping surface 301 according to the specific implementation of the present invention. A plurality of teeth 400 are formed on the recessed gripping surface 301, whereby the teeth are configured to engage the reinforcing bars, in particular their end portions. According to the specific implementation of the present invention teeth 400 are formed as a plurality of ridges, these ridges extending over a distance of the inner surface 300 and comprise peaks 401 and troughs 402. According to the specific implementation of the present invention teeth 400 comprising peaks 401 and troughs 402 are symmetrical about any cross-section. According to further specific implementations of the present invention teeth 400 at any cross-section are asymmetric. According to the specific implementation of the present invention the pitch of the teeth and nature of the troughs 402 and peaks 401 are optimized to ensure a maximum gripping affect of the reinforcing bars for a variety of both reinforcing bar diameter and corresponding tubular body diameter. Teeth 400 may be formed on one or all recessed gripping surfaces 301 of the tubular body 201. Additionally, teeth 400 may comprise a hardness greater than that of the bar and/or coupler body.

According to a further specific implementation of the present invention teeth 400 comprise individual raised portions being cones, square based pyramids, and any other form of pointed projection.

Figure 5:
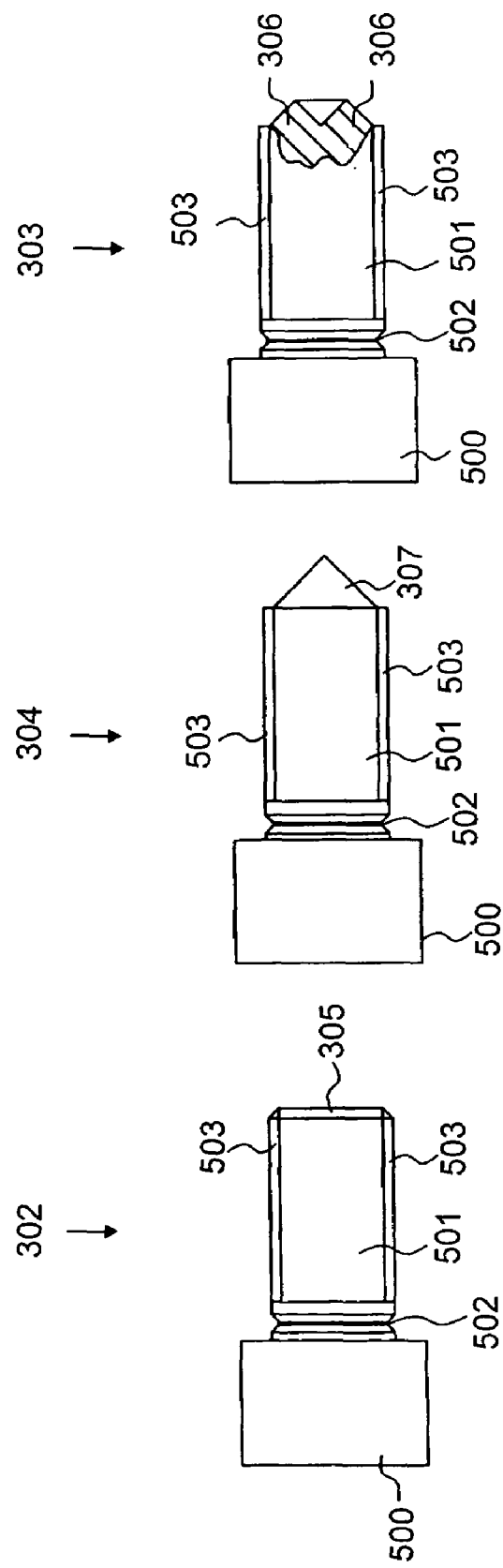
FIG. 5a illustrates a plan view of one of the plurality of engagers according to one aspect of the present invention.
FIG. 5b illustrates a plan view of one of the plurality of engagers according to one aspect of the present invention.
FIG. 5c illustrates a plan view of one of the plurality of engagers according to one aspect of the present invention.

Referring to FIG. 5*a* herein is illustrated a plan view of engager 302 according to a specific implementation of the present invention and as detailed with reference to FIG. 3 herein. Engager 302 comprises an engager head 500, and engager body 501, a shear band 502, screw threads 503 and an end portion 305. The provision of screw threads 503 configures engager 302 for adjustable positioning within any one of holes 202 via screw threads 203. Shear band 502 is configured to shear following a torque force applied to engager 302 via engager head 500 such that shear band 502 separates the engager head 500 from the engager body 501 according to a predetermined applied torque force.

The shear band of engager 302 is of a diameter sufficient to ensure separation of engager head 500 from engager body 501 so as to produce the correct engaging of end portion 305 onto an outer surface of reinforcing bars 101.

Referring to FIG. 5*b* herein there is illustrated a plan view of engager 304 according to a specific implementation of the present invention and as detailed with reference to FIG. 3 herein. Engager 304 comprises an engager head 500, an engager body 501, a shear band 502, screw threads 503 and an end portion 307. Shear band 502 within engager 304 is operable as described with reference to FIG. 5*a* serving to separate engager head 500 from engager body 501 in response to an applied torque force. However, a diameter of shear band 502 in respect of engager 304 may be different to that for engager 302 as engager 304 is configured for engaging into the reinforcing bars 101 using end portion 307. As a consequence, the diameter of shear band 502 for engager 304 may be different than that for engager 302.

Referring to FIG. 5*c* herein there is illustrated a plan view of engager 303 according to a specific implementation of the present invention, as detailed with reference to FIG. 3 herein. Engager 303 comprises an engager head 500, an engager body 501, a shear band 502, screw threads 503 and an end portion 306.

According to the specific implementation of the present invention the shear band for engager 303 is configured to separate engager head 500 from engager body 505 in response to an applied torque force such that end portion 306 is configured for an engaging partially into reinforcing bars 101. As engager 304 is configured for engaging into the reinforcing bars via end portion 307 and engager 302 is configured for engaging onto the reinforcing bars via end portion 305, a diameter of shear band 502 for engager 303 may be an intermediate size between those of engagers 302 and 304 due to a configuring for engaging partly into the reinforcing bars via end portion 306.

According to the specific implementation of the present invention end portions 305, 306 and 307 have a hardness greater than that of reinforcing bars 101. According to a further specific implementation of the present invention engagers 302, 303 and 304 have a hardness greater than that of reinforcing bars 101.

Figure 6:
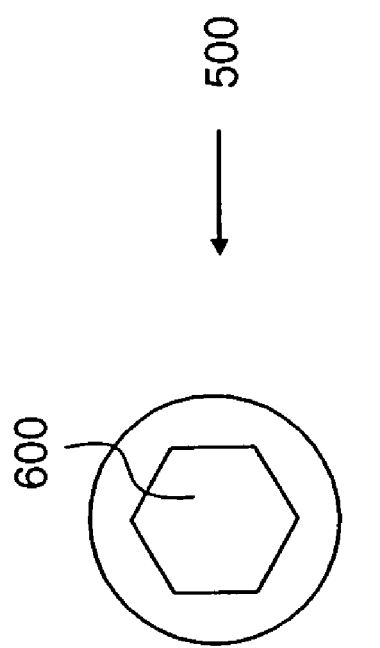
FIG. 6 illustrates a plan view of a top portion of one of the plurality of engagers according to one aspect of the present invention.

Referring to FIG. 6 herein there is illustrated a plan view of engager head 500 of engagers 302, 303 and 304 according to the specific implementation of the present invention. Engager head 500 comprises a recessed portion 600 being configured to interface with an engager tightening device.

For engagers 302, 303 and 304, each length and diameter of engager body 501 and engager head 500 is maximized to ensure the diameter and length of the tubular body 201 satisfies any national or international standard imposed by any regulatory organization. For example, a diameter of each engager head 500 is optimized to ensure the correct number of engagers can be positioned along the length of the tubular body without the requirement for an extended tubular body.

Figure 7C:
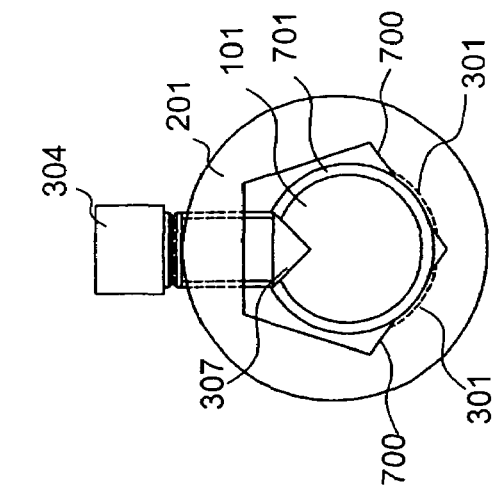
FIG. 7c illustrates an end view of the coupling device and reinforcing bars according to one aspect of the present invention.
Figure 7B:
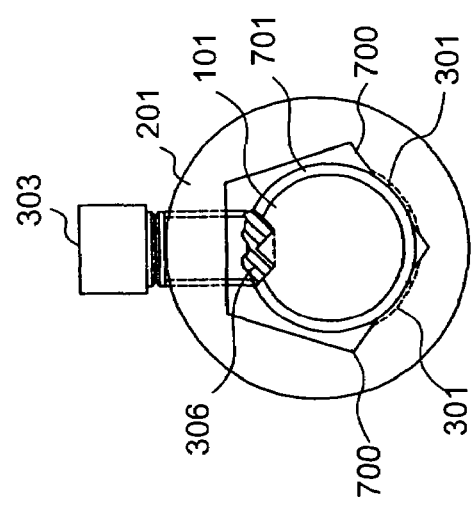
FIG. 7b illustrates an end view of the coupling device and reinforcing bars according to one aspect of the present invention.
Figure 7A:
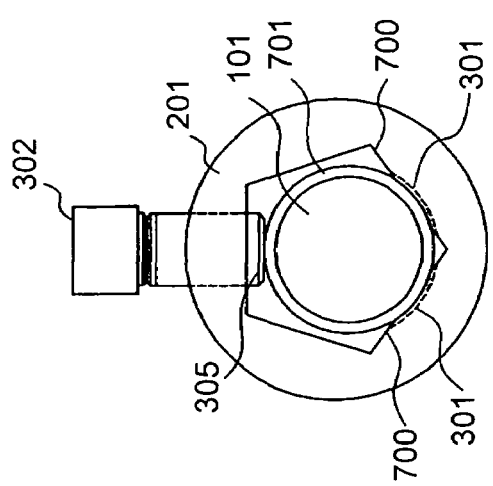
FIG. 7a illustrates an end view of the coupling device and reinforcing bars according to one aspect of the present invention.

Referring to FIG. 7*a* herein there is illustrated an end view of the coupling device according to the specific implementation of the present invention comprising elongate tubular body 201, at least one positively adjustable engager 302, reinforcing bar 101 and at least one recessed gripping surface 301 being formed on at least one face 700 of inner surface 300. In operation, coupling device 200 is configured to receive reinforcing bars, in particular their end portions, and to grip and couple bars 101 via gripping surfaces 301 and teeth 400, being formed on surfaces 301 in response to an engaging of bars 101 by the plurality of engagers 302, 303 and 304.

According to the specific implementation of the present invention elongate tubular body 201 comprises inner surface 300 being divided into five faces providing a pentagonal inner surface cross-section. All five faces extend longitudinally on inner surface 300, inner surface 300 extending longitudinally within tubular body 201 so as to define a pentagonal shape through a cross-section of tubular body 201 along substantially the full length of coupling device 200. Gripping surfaces 301 comprising teeth 400 comprise a radius of curvature extending perpendicular to a longitudinal axis of tubular body 201, the radius of curvature of gripping surface 301 being equal to a radius of curvature of an outer surface of reinforcing bars 101, in particular the end portions, at a cross-section of the reinforcing bars.

According to the specific implementation of the present invention reinforcing bars 101 are seated on recessed gripping surfaces 301 whereby, due to the radius of curvature of gripping surfaces 301, extended contact is achieved and maintained between coupling device 200 and reinforcing bars 101. As illustrated in FIG. 7*a* herein, positively adjustable engager 302 is adjusted through holes 203 so as to be engaging onto reinforcing bars 101 via end portion 305.

As is known in the art, reinforcing bars 101 generally comprise ribs or ridges 701 provided on an outer surface of bars 101. According to the specific implementation of the present invention gripping surfaces 301 are configured to grip the reinforcing bars 101, in particular the ribs 701 of the bars. As it is common to reinforcing bars 101 found within the art, ribs are generally provided on the bar outer surface at the bar end portions. Accordingly, the specific implementations of the present invention as described herein are optimized and configured for the coupling of reinforcing bars comprising ribbed end portions. Additionally, positively adjustably engagers 302, 303 and 304 are configured for an engaging onto or an engaging into reinforcing bars 101 both at a ribbed region 701 and a non-ribbed region.

Referring to FIG. 7b herein there is illustrated an end view of the coupling device according to the specific implementation of the present invention comprising tubular body 201, at least one recessed gripping surface 301 and at least one positively adjustable engager 303 having end portion 306. As with FIG. 7a, reinforcing bars 101 are seated in a lower portion of tubular body 201 due to the recessed gripping surfaces 301 comprising radii of curvature being near equal to that of reinforcing bars 101, 701, recessed gripping surfaces 301 being formed on faces 700 and extending longitudinally on each of these faces.

In operation, end portion 306 of positively adjustable engager 303 is configured for engaging partially into reinforcing bars 101, 701 following application of a torque force as described with reference to FIG. 6 herein corresponding to positively adjustable engagers 302, 303 and 304. The degree of penetration of end portion 306 is determined by the diameter of shear band 502, a smaller diameter shear band resulting in less engager penetration than a corresponding greater shear band providing greater penetration.

Referring to FIG. 7c herein there is illustrated an end view of the coupling device according to the specific implementation of the present invention comprising elongate tubular body 201, at least one positively adjustable engager 304 having end portion 307, and at least one gripping surface 301 being formed on at least one face 700. As described with reference to FIGS. 7a and 7b herein, reinforcing bars 101 are seated in a lower portion of the coupling device due to the radii of curvature of recessed gripping surfaces 301. Positively adjustable engager 304 is adjusted through at least one hole 202 and is configured for engaging into reinforcing bars 101, 701. Again, as described with reference to FIG. 7b, the magnitude of penetration into reinforcing bars 101, 701 is determined by the diameter of shear band 502.

Figure 8:
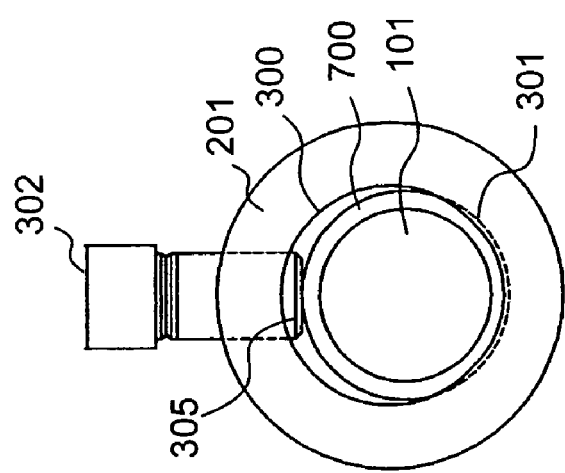
FIG. 8 illustrates an end view of the coupling device and reinforcing bars according to one aspect of the present invention.

Referring to FIG. 8 herein there is illustrated an end view of the coupling device according to a further specific implementation of the present invention comprising an elongate tubular body 201, a positively adjustable engager 302 and inner surface 300 comprising a single face and at least one recessed gripping surface 301. According to the further specific implementation of the present invention inner surface 300 at any cross-section through tubular body 201 defines a substantially circular shape or similar.

The general mode of operation of the further specific implementation of the present invention as detailed with reference to FIG. 8 herein is similar to that described with reference to FIG. 7a. However, according to the further specific implementation of the present invention a single recessed gripping surface 301 is provided at a substantially opposed region of tubular body 201 in relation to the plurality of positively adjustable engagers 302, 303 and 304.

Figure 9:
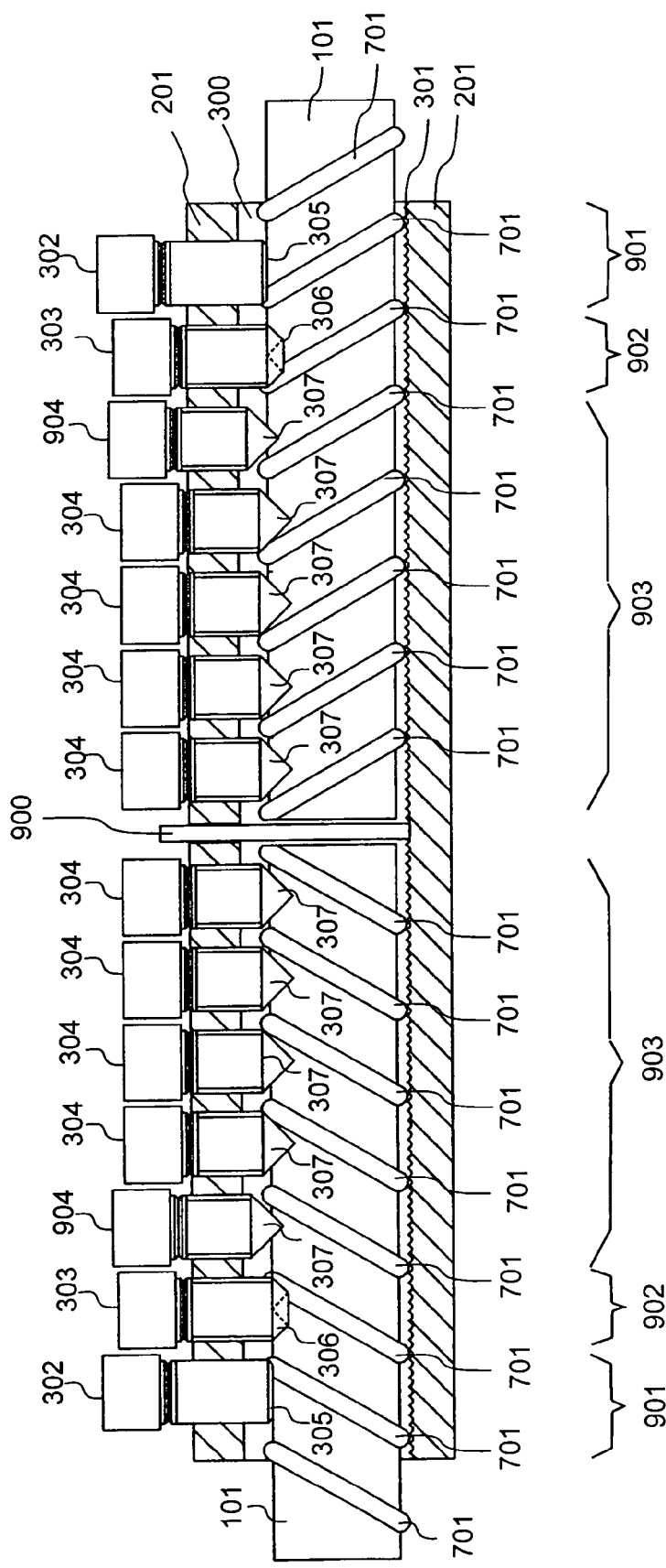
FIG. 9 illustrates a cross-sectional side elevation view of the coupling device according to one aspect of the present invention.

Referring to FIG. 9 herein there is illustrated a cross-sectional side elevation view of the coupling device according to the specific implementation of the present invention comprising elongate tubular body 201, inner surface 300, the plurality of engagers 302, 303 and 304, removably insertable pin 900 and at least one recessed gripping surface 301. Pin 900 is provided through hole 204 positioned centrally within tubular body 201 and extending through inner surface 300 so as to prevent any one of reinforcing bars 101 extending longitudinally beyond a central cross-section of tubular body 201. At least one positively adjustable engager 302, comprising end portion 305 is positioned at an outer most region 901 along a length of the elongate tubular body 201. At least one positively adjustable engager 303 comprising end portion 306 is positioned at an intermediate region 902 along a length of the elongate tubular body 201. At least one positively adjustable engager 304 comprising end portion 307 is positioned at an inner most region 903 along a length of the elongate tubular body 201.

According to specific implementations of the present invention the multiplicity and positioning of the plurality of engagers 302, 303 and 304 are optimized for any length of elongate tubular body 201 so as to provide a coupling device being configured for progressive load transfer along the length of the coupler body such that bar breakage within the tubular body 201 is avoided up to and including the ultimate tensile strength of the reinforcing bars. As such, the penetration of each of the plurality of engagers is controlled along the length of the coupling region such that a cross-sectional area of the bars is not reduced beyond an ability of the reinforcing bars to carry a loading force in the reinforcing bars at a point of engaging by each of the engagers.

Figure 1:
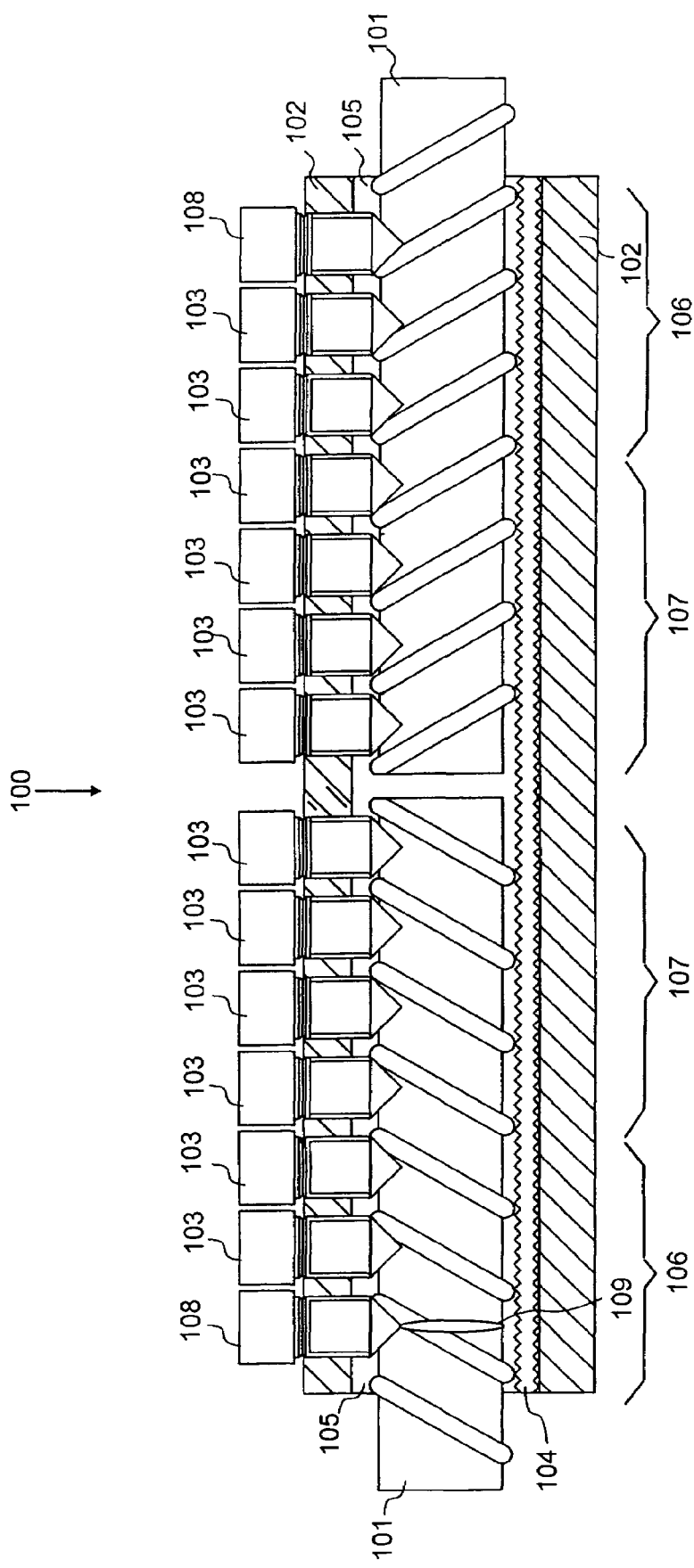
FIG. 1 illustrates a cross-sectional side elevation view of a prior art reinforcing bar coupling device.

As described with reference to FIG. 1, and in response to a force being applied to the reinforcing bars 101, either as a tensile force or compression force, the force in the bars 101, referring to FIG. 9, is transferred from bars 101 to the coupling device in gradually reducing magnitude from outer most regions 901 through 902 to 903. Accordingly, in region 901 comprising positively adjustably engager 302, a maximum transfer of loading force from bar 101 to coupling device 200 is observed. Through the utilization of end portion 305, reinforcing bar 101 does not comprise a significantly reduced cross-sectional area at region 901. Additionally, as engager 302 is configured for engaging onto reinforcing bars 101 with no or near zero bar penetration, the magnitude of loading force transfer from reinforcing bars 101 to region 901 of coupling device 200 is reduced relative to that detailed with reference to FIG. 1 herein at regions 106. Similarly, through provision of end portion 306 being configured for engaging partially into bars 101, the magnitude of load transfer in region 902 is reduced relative to that indicated with reference to FIG. 1 herein at regions 106. According to all specific implementations of the present invention a coupling device 200 is provided which more evenly transfers load from bars 101 to coupling device 200 along the length of tubular body 201. In a specific implementation of the present invention positively adjustable engagers 904 being similar to engagers 304 comprise a shear band diameter being slightly reduced to that for engagers 304 such that end portions 307 of engagers 904 do not penetrate into bars 101 to the same extent as those for engagers 304.

Due to the more progressive transfer of load from bars 101 to coupling device 200 due to the nature and positioning of the plurality of engagers 302, 303, 304, and 904, the coupling device is configured to maintain coupling of reinforcing bars following a maximum loading force to the bars 101, up to and including the ultimate tensile strength of the bars wherein at least one of the reinforcing bars breaks in a region outside the elongate tubular body 201 following application of this loading force.

Figure 10:
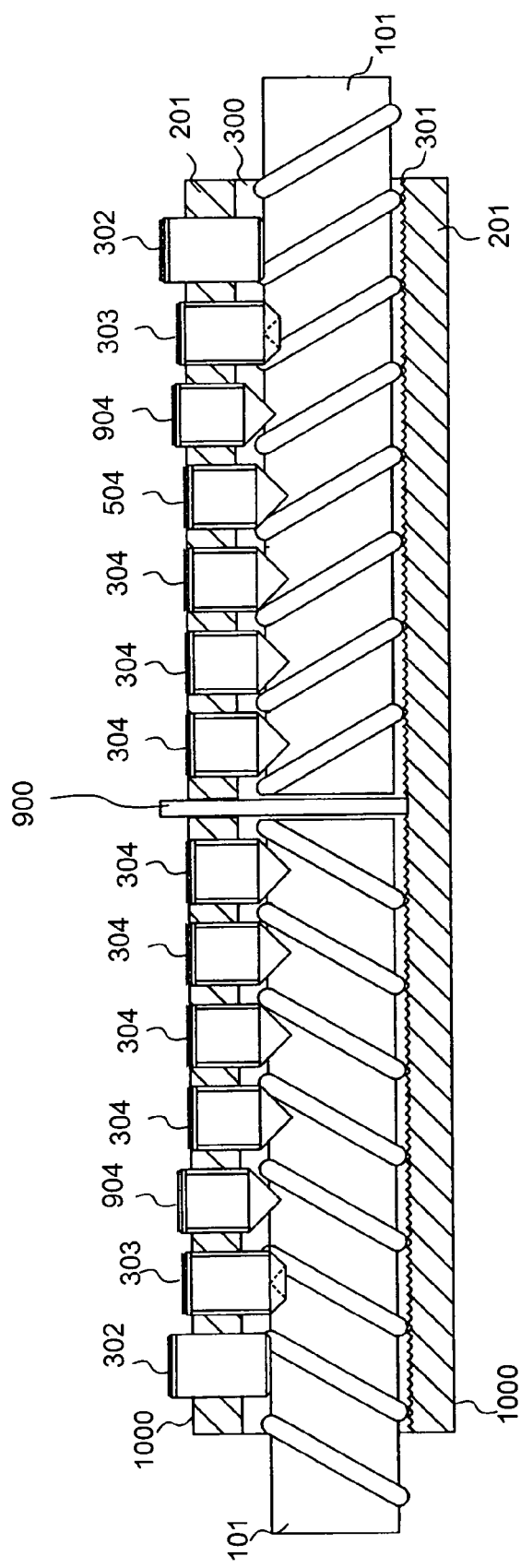
FIG. 10 illustrates a cross-sectional side elevation view of the coupling device according to one aspect of the present invention.

Referring to FIG. 10 herein there is illustrated a cross-sectional side elevation view of the coupling device according to the specific implementation of the present invention. FIG. 10 illustrates the coupling device following application of a torque force to each of the plurality of engagers 302, 303, 304 and 904 wherein each engager head is separated from each engager body via shear band 502. The length of each engager body is configured such that following a shearing of shear bands 502 engager bodies 501 do not extend beyond an outer surface 1000 of tubular body 201 by a large amount.

According to a further specific implementation of the present invention each positively adjustable engager is 302, 303 and 304 are configured with recess portions 600 as detailed with reference to FIG. 6 herein, being provided directly into each engager body 501 negating requirement for engager head 500 and shear band 502. As such, positively adjustable engagers according to the further specific implementation of the present invention are adjusted through holes 203 via screw threads such that each of the engager bodies 501 do not extend substantially beyond an outer surface 1000 of the elongate tubular body 201.

It will be appreciated by those skilled in the art that the coupling device as described herein is configured to couple bars, wires or cables for a variety of bar, wire and cable diameters.

Referring to FIG. 11a herein there is illustrated a cross-sectional side elevation view of the coupling device according to a further specific implementation of the present invention. Coupling device 1100 comprises elongate tubular body 1103; inner surface 1104; at least one gripping surface 1105; pin 1106; a plurality of engagers 303, 304, 1101.

Engagers 303 and 1101 are positioned at an outer region of coupler body 1103, each engager 303 and 1101 comprising an end portion 306, 1102, respectively, for partial penetration into the reinforcing bar 1101. According to the further specific implementation of FIG. 11a end portion 1102 of engager 1101 is configured for bar penetration to a lesser extent than engager end portion 306 of engager 303. As will be apparent to those skilled in the art, end portion 1102 comprises a truncated pointed region similar to that of end portion 306 such that only minimal bar penetration is achieved with reference to engagers 303 and particularly engagers 304. End portions 306 and 1102 may be considered to comprise a concave recess or dish type shape located at the region of bar engagement. According to the further specific implementation of the present invention end portion 1102 comprises a concave recess or dish being more shallow than that of engager end portion 306.

As will be appreciated by those skilled in the art, any type of end portion 1102 and 306 may be employed to provide engager 1101 being configured for bar penetration to a lesser extent than engager 303, engagers 1101 and 303 engaging into the reinforcing bar to a lesser extent than engagers 304.

Figure 11B:
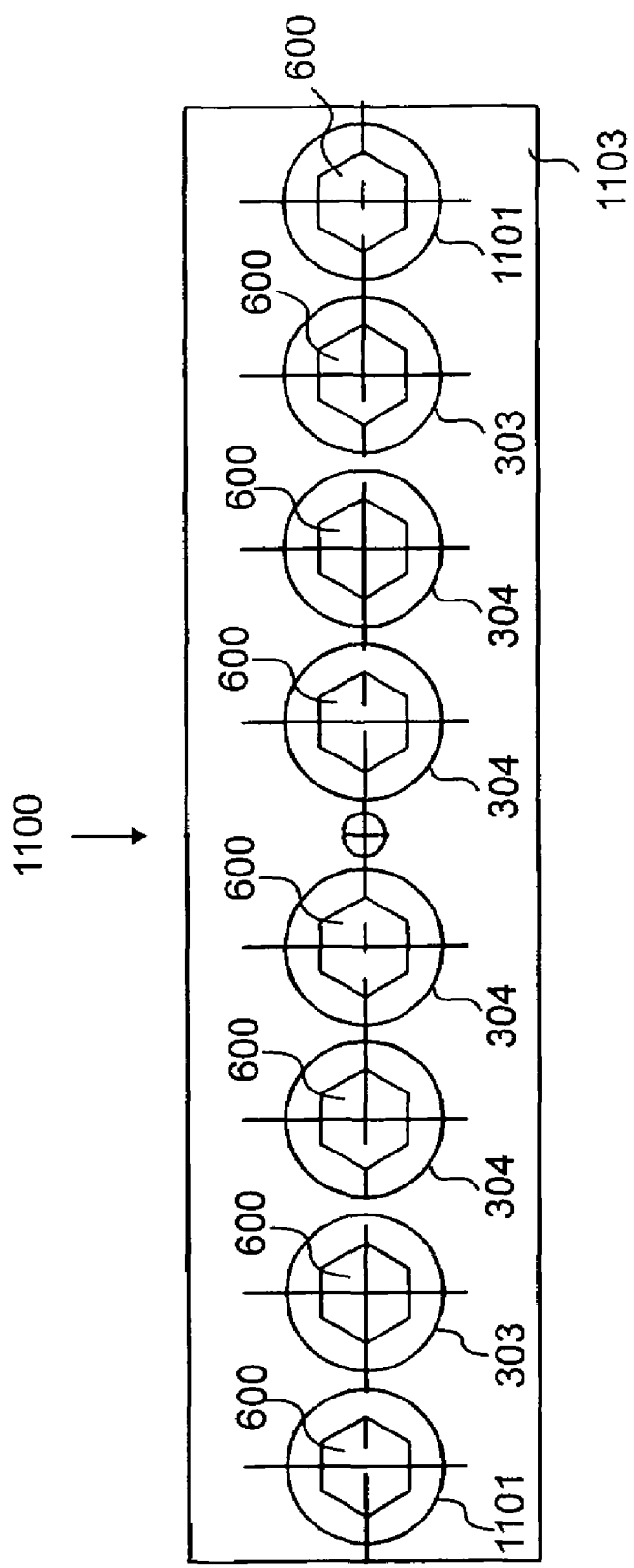
FIG. 11b illustrates a plan view of the coupling device according to the FIG. 11a embodiment.

Referring to FIG. 11b herein there is illustrated a plan view of the bar coupler of FIG. 11a comprising engagers 303, 304 and 1101. Each engager comprises an engager head 500, each engager head comprising a recessed portion 600 being configured to interface with an engager tightening device. Each of the engagers is adjustably positioned through the elongate tubular body 1103, the positioning of the engagers through the body being provided by holes within the tubular body.

Figure 12:
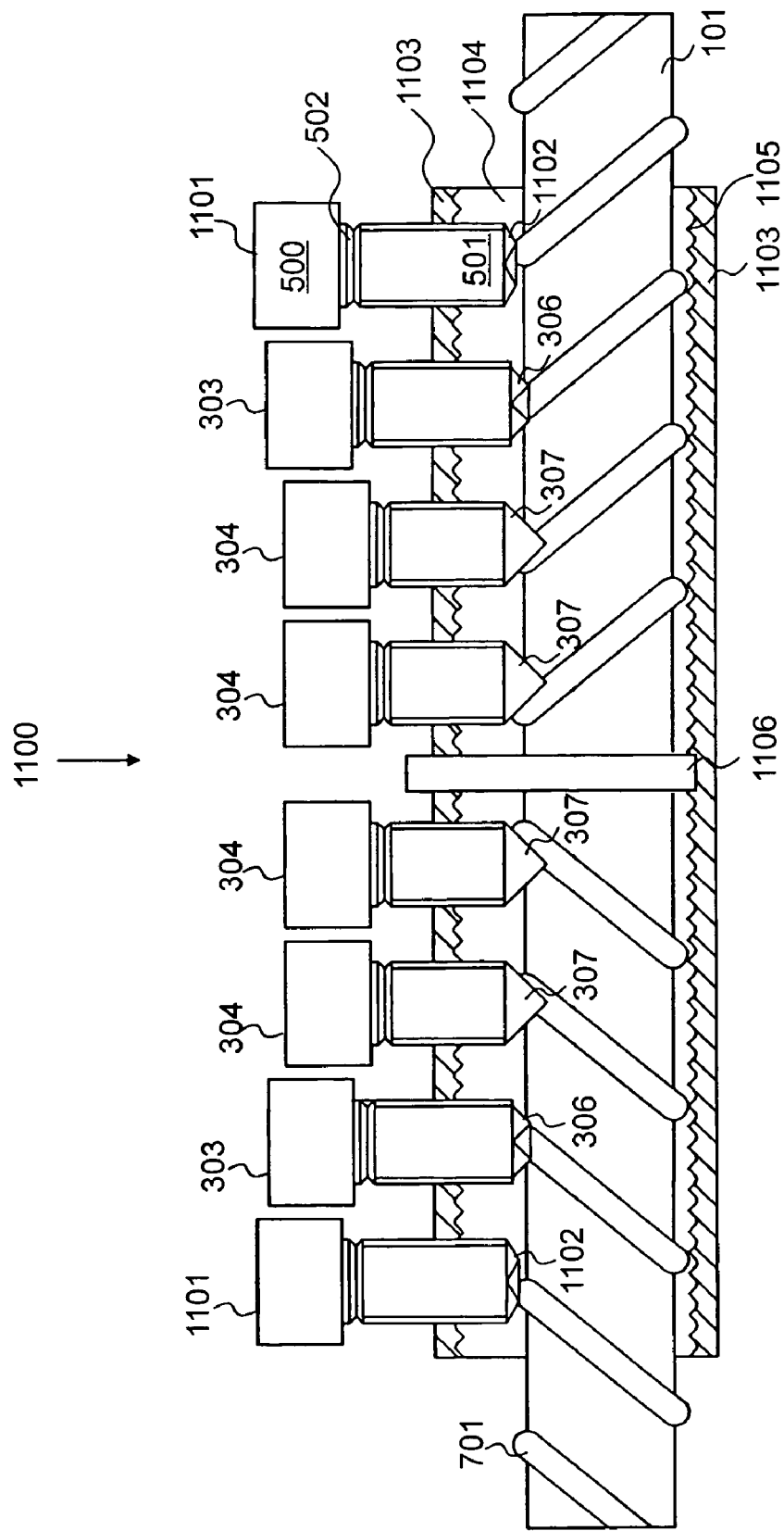
FIG. 12 illustrates a cross-sectional side elevation view of the coupling device according the FIG. 11b embodiment.

Referring to FIG. 12 herein there is illustrated a cross-sectional elevation view of the coupling device of FIG. 11b herein. The coupling device 1100 is illustrated with the plurality of engagers 303, 304 and 1101 where end portions 1102 of engagers 1101 penetrate into the reinforcing bars 701 to a lesser extent than end portions 306, 307 of engagers 303, 304 respectively. Shear band 502 of engager 1101 may be configured to shear in response to an applied torque force to engager head 500 such that shear band 502 separates engager head 500 from engager body 501. According to the further specific implementation of FIG. 12 herein shear band 502 is configured such that the torque force applied to engager 1101 is less than that required in respect of engagers 303 and 304 to achieve a shearing of shear band 502 and a separation of engager head 500 from engager body 501. Accordingly reduced bar penetration is achieved in respect of engager 1101 relative to engagers 303 and in particular 304. Additionally, engager end portions 1102 and 306 have different dimensions so as to provide a different engaging of reinforcing bars 101.

Figure 13:
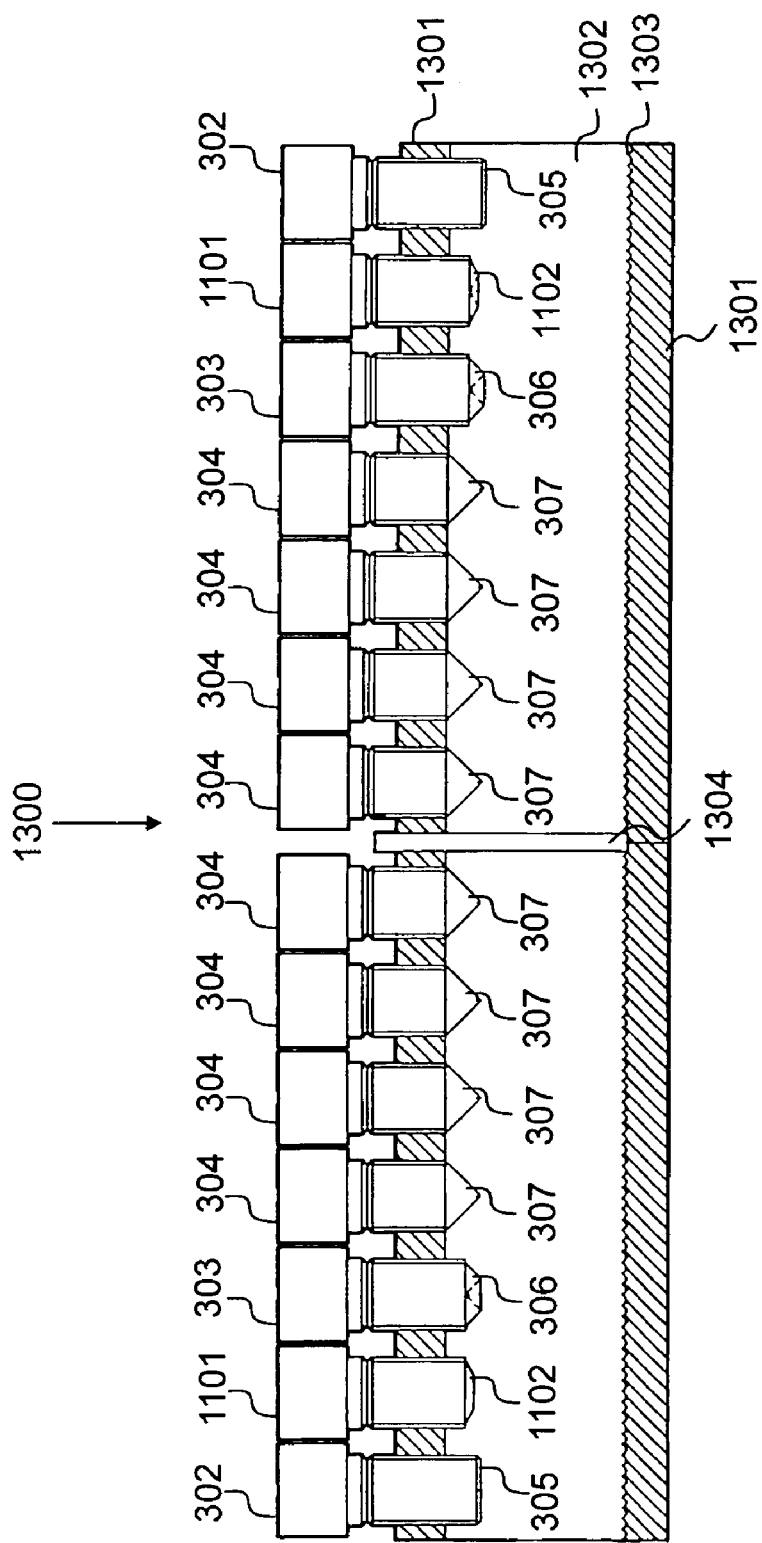
FIG. 13 illustrates a cross-sectional side elevation view of the coupling device according to a further specific implementation of the present invention.

Referring to FIG. 13 herein there is illustrated a cross-sectional side elevation view of the coupling device according to a further specific implementation of the present invention comprising an elongate tubular body 1301; an inner surface 1302; a gripping surface 1303; a plurality of engagers 302, 303, 304, 1101; removably insertable pin 1304.

According to the specific embodiment of FIG. 13, four different types of engager are employed within the coupling device 1300. The first type of engager 302 positioned at an outer most region of tubular body 1301 is configured for an engaging onto the reinforcing bars 101. Engagers 303, 1101, positioned at intermediate region of the tubular body 1301 are configured for a partial penetration of the reinforcing bars 1101 as described with reference to FIG. 12 herein. Engagers 304 positioned at an inner most region of tubular body 1301 are configured for an engaging into the reinforcing bars 1101 as described with reference to FIGS. 9 and 12 herein. The relative engaging onto, partially into and substantially into the reinforcing bars 101 is provided by configuring a plurality of different engagers with a plurality of different end portions as described herein. In addition, shear band 502 may be adjusted so as to achieve the desired degree of bar engaging in combination with the plurality of different end portions.

According to the specific implementations of the present invention as detailed with reference to FIGS. 9, 12 and 13 herein the amount of load transfer from bar to coupling device 900, 1100 and 1300, respectively, is progressive along the length of the coupler body such that bar breakage within the tubular body is avoided up to and including the ultimate tensile strength of the reinforcing bars. With reference to FIG. 13 herein the magnitude of loading force transfer from reinforcing bars 1101 increases progressively from engager 302 to 1101 to 303 to 304 due to the relative magnitude of bar engaging being a consequence of non-bar penetration, partial bar penetration and substantial bar penetration, respectively.

Figure 14:
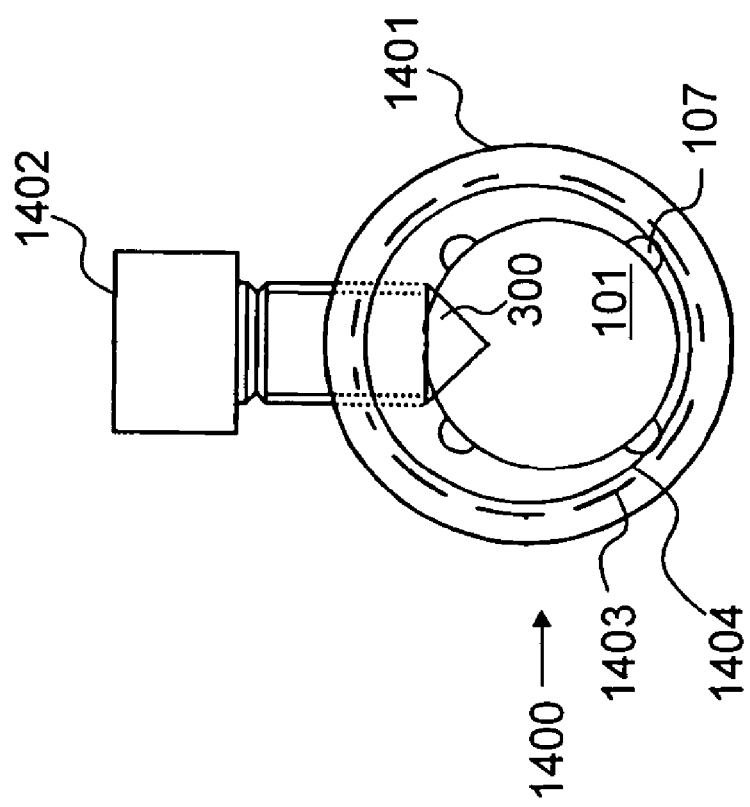
FIG. 14 illustrates an end view of the coupling device according to a further specific implementation comprising a gripping surface.

Referring to FIG. 14 herein there is illustrated an end view of the coupling device 1400 according to a further specific implementation of the present invention comprising an elongate tubular body 1401; a plurality of positively adjustable engagers 1402; an inner surface 1403 and a gripping surface 1404.

According to the further specific implementation of FIG. 14 herein the reinforcing bar 101 is engaged by the plurality of engagers 1402 being adjustably positioned through the engager body 1401 as described with reference to FIGS. 2 to 13 herein such that bars 101 are forced against gripping surface 1404 so as to provide a secure bar coupling joint. Gripping surface 1404 comprises a plurality of teeth or ridges formed substantially uniformly over the inner surface of tubular body 1401. Such that in the event of the bar 101 sitting displaced, off-set, from a central or symmetrical position within coupler body 1401 the gripping surface is configured to grip the bar at all points of contact between the inner surface of the tubular body and an outer surface of the bar.

According to a specific implementation of the further embodiment of FIG. 14 herein the plurality of teeth may comprise screw threads formed uniformly over the entire inner surface of tubular body 1401. According to yet further specific implementations, gripping surface 1404 may comprise a series of grooves or ridges extending substantially perpendicular or transverse to the length of tubular body 1401. As will be appreciated by those skilled in the art, any specific or combination of gripping elements may be formed on the inner surface so as to provide a wedging surface configured to grip the reinforcing bars. According to the FIG. 14 embodiment coupling device 1400 is usable with any combination of engagers as detailed with reference to FIGS. 2 to 13 herein such that the coupling device may comprise a plurality of engagers configured with a plurality of different end portions for a different engaging of the reinforcing bars such that the reinforcing bars are gripped by gripping surface 1404.

Figure 15:
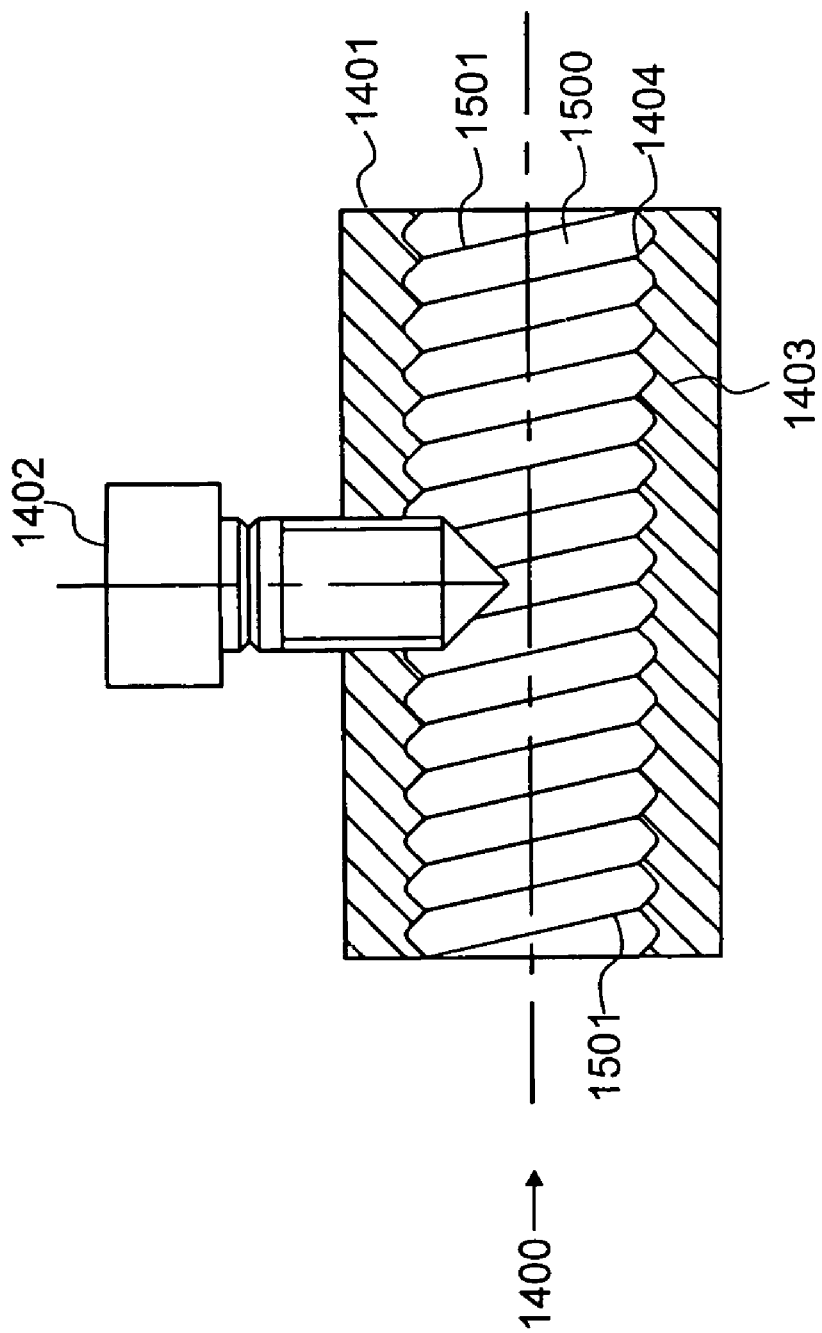
FIG. 15 illustrates a cross-sectional side elevation view of the coupling device of the FIG. 14 embodiment.

Referring to FIG. 15 herein there is illustrated a cross-sectional side elevation view of a section of coupling device 1400 of FIG. 14 herein comprising tubular body 1401; inner surface 1500; and gripping surface 1404.

According to the embodiment of FIG. 15 herein the inner surface 1500 of tubular body 1401 comprises screw threads 1501 formed over substantially the entire inner surface 1500 of tubular body 1401. Accordingly a plurality of ridges are formed on gripping surface 1404 so as to provide means to grip the reinforcing bars thereby preventing displacement, slip or movement following a coupling of the reinforcing bars within the tubular, alternatively termed sleeve-like body 1401. As detailed with reference to FIG. 14 herein, the ridges or gripping surface provided on the inner surface of the tubular body 1500 may comprise any form of transverse ridges having a plurality of peak and trough type distributions so as to present raised gripping points to engage the reinforcing bars.

As will be appreciated by those skilled in the art the invention as disclosed herein may be utilized in any of the specific embodiments of FIGS. 2 to 15 herein, such specific embodiments comprising similar or identical components and functionality as described herein with reference to alternative embodiments. In particular, the specific embodiments of FIGS. 11a to 15 incorporate by reference all components and functionality as described with reference to FIGS. 2 to 10 herein.

The invention claimed is:

1. A coupling device for coupling reinforcing bars used in structural concrete comprising:
   an elongate tubular body for receiving end portions of said reinforcing bars;
   a plurality of threaded engagers being adjustably positioned through threaded holes in said tubular body;
   said coupling device being characterized in that:
   said plurality of engagers are configured with a plurality of different types of end portions for engaging said reinforcing bars;
   wherein said different types of end portions have different end shapes that are configured for different types of respective engagings of said reinforcing bars.

2. The coupling device as claimed in claim 1, wherein said plurality of different types of end portions of said plurality of engagers are configured to transfer a different amount of a loading force applied to said reinforcing bars from said reinforcing bars to said coupling device.

3. The coupling device as claimed in claim 1 wherein at least one engager of said plurality of engagers is configured for an engaging partially into said reinforcing bars and at least one engager of said plurality of engagers is configured for an engaging substantially into said reinforcing bars.

4. The coupling device as claimed in claim 1 wherein said plurality of different types of end portions comprise:
   a first type of end portion having a concave recess shape tip, configured for penetration into said reinforcing bars; and
   a second type of end portion having a single pointed tip, configured for penetration into said reinforcing bars to a greater extent than said first type of end portion.

5. The coupling device as claimed in claim 4 wherein said plurality of different types of end portions further comprise:
   a third type of end portion having a blunt tip, configured for an engaging onto said reinforcing bars with substantially no bar penetration.

6. The coupling device as claimed in claim 5,
   wherein said plurality of different types of end portions further comprise:
   a fourth type of end portion having a concave recess shape tip shallower than said first type of end portion, configured for penetration into said reinforcing bars to a lesser extent than said first type of end portion.

7. The coupling device as claimed in claim 5 wherein at least one engager of said plurality of engagers comprising said third type of end portion is positioned at an outermost region along a length of said elongate tubular body.

8. The coupling device as claimed in claim 4,
   wherein at least one engager of said plurality of engagers comprising said first type of end portion is positioned at an outermost region along a length of said elongate tubular body; and
   wherein at least one engager of said plurality of engagers comprising said second type of end portion is positioned at an innermost region along a length of said elongate tubular body.

9. The coupling device as claimed in claim 1 wherein said plurality of engagers comprise a plurality of shear bands, said shear bands comprising a plurality of different diameters;
   wherein an engaging of said reinforcing bars by said plurality of engagers is controlled using said plurality of shear bands.

10. The coupling device as claimed in claim 1 wherein said plurality of engagers have a hardness greater than that of said reinforcing bars.

11. The coupling device as claimed in claim 1 wherein said plurality of different end portions have a hardness greater than that of said reinforcing bars.

12. The coupling device as claimed in claim 1 further comprising:
    at least one face extending longitudinally on an inner surface of said tubular body; and
    at least one gripping surface being formed on said at least one face and extending longitudinally on said at least one face;
    wherein said at least one gripping surface is configured to grip said reinforcing bars in response to an engaging of said reinforcing bars by said plurality of engagers.

13. The coupling device as claimed in claim 12, wherein said at least one gripping surface comprises a plurality of teeth being formed on said at least one gripping surface, said teeth being configured to engage said reinforcing bars in response to an engaging of said reinforcing bars by said plurality of engagers.

14. The coupling device as claimed in claim 12 further comprising screw threads formed on said at least one gripping surface.

15. The coupling device as claimed in claim 12 further comprising a plurality of ridges formed on said at least one gripping surface, said ridges being positioned transverse to a length of said elongate tubular body.

16. The coupling device as claimed in claim 1 wherein said coupling device is a steel coupling device.

17. The coupling device as claimed in claim 1 wherein said engaging of said reinforcing bars by said plurality of engagers is controlled such that a cross-sectional area along a length of said reinforcing bars within a region of said elongate tubular body is not reduced beyond an ability of said reinforcing bars to carry a loading force in said reinforcing bars at a point of engaging by each of said plurality of engagers.

18. The coupling device as claimed in claim 1,
in combination with said end portions of said reinforcing bars;
wherein said different types of end portions penetrate said reinforcing bar end portions to different extents.

19. The coupling device as claimed in claim 1, wherein said different types of end portions include:
a blunt tip end portion; and
a pointed tip end portion.

20. The coupling device as claimed in claim 19,
wherein at least one engager of said plurality of engagers having said blunt tip end portion is positioned at an outermost region along a length of said elongate tubular body; and
wherein at least one engager of said plurality of engagers having said pointed tip end portion is positioned at an innermost region along a length of said elongate tubular body.

21. The coupling device as claimed in claim 19, wherein said pointed tip end portion is a single pointed tip end portion.

22. The coupling device as claimed in claim 19, wherein said different types of end portions further include a concave recess shape end portion.

23. The coupling device as claimed in claim 19,
wherein said different types of end portions further include a pair of concave recess shape end portions; and
wherein one of the said concave recess shape end portions is shallower than the other of the said concave recess shape end portions.

24. The coupling device as claimed in claim 1, in combination with said end portions of said reinforcing bars;
wherein said different types of end portions include:
a blunt tip end portion; and
a single pointed tip end portion;
wherein at least one engager of said plurality of engagers having said blunt tip end portion is positioned at an outermost region along a length of said elongate tubular body, engaging onto said reinforcing bar end portions with substantially no bar penetration; and
wherein at least one engager of said plurality of engagers having said single pointed tip end portion is positioned at an innermost region along a length of said elongate tubular body, penetrating into said reinforcing bar end portions.

25. The coupling device of claim 24, wherein the blunt tip end portion is a substantially flat tip end portion.

26. A coupling device for coupling bars comprising:
a sleeve-like body for receiving said bars;
a plurality of threaded engagers being adjustably positioned through threaded holes in said sleeve-like body;
said coupling device being characterized in that:
at least one of said plurality of engagers comprises a first type of end portion having a first end shape, configured for a first type of engaging of said bars; and
at least one of said plurality of engagers comprises a second type of end portion having a second end shape, configured for a second type of engaging of said bars.

27. The coupling device as claimed in claim 26 wherein at least one engager of said plurality of engagers comprises a third type of end portion having a third end shape, configured for a third type of engaging of said bars.

28. The coupling device as claimed in claim 27 wherein at least one engager of said plurality of engagers comprises a fourth type of end portion having a fourth end shape, configured for a fourth type of engaging of said bars.

29. The coupling device as claimed in claim 28,
wherein said first type of end portion has a concave recess shape tip, configured for penetration into said bars; and
wherein said second type of end portion has a single pointed tip, configured for penetration into said bars to a greater extent than said first type of end portion.

30. The coupling device as claimed in claim 29
wherein said third type of end portion having a blunt tip, is configured for engaging onto said bars; and
wherein said fourth type of end portion has a concave recess shape tip shallower than said first type of end portion, configured for penetration into said bars to a lesser extent than said first type of end portion.

31. The coupling device as claimed in claim 26 further comprising a plurality of ridges formed on an inner surface of said sleeve-like body, said ridges being positioned transverse to length of said sleeve-like body and configured to grip said bars in response to an engaging of said bars by said plurality of engagers.

32. The coupling device as claimed in claim 31 wherein said ridges are formed as screw threads.

33. A coupling device for coupling bars comprising:
a sleeve-like body for locating over and about portions of said bars;
a plurality of threaded engagers positioned though threaded holes in said sleeve-like body, said engagers being positively adjustable through said sleeve-like body;
said coupling device being characterized in that:
said plurality of engagers are different types of engagers having different end shapes for different respective types of engagings of said bars.

34. The coupling as claimed in claim 33,
wherein at least one engager of said plurality of engagers is a blunt tip end portion engager configured for an engaging onto said bars; and
wherein at least one engager of said plurality of engagers is a pointed tip end portion engager configured for an engaging substantially into said bars.

35. The coupling device as claimed in claim 34 wherein at least one engager of said plurality of engagers is a concave recess shape end portion engager configured for an engaging partially into said bars.

36. A method of coupling reinforcing bars used in structural concrete comprising:
receiving end portions of said reinforcing bars in an elongate tubular body;
adjustably positioning a plurality of threaded engagers through threaded holes in said tubular body;
said method being characterized by:
engaging said reinforcing bars with a plurality of different types of end portions of said plurality of engagers, said different types of end portions having different end shapes being configured for different respective types of engagings of said reinforcing bars; and coupling said reinforcing bars by said different types of engaging of said reinforcing bars by said different types of end portions, to different extents of bar penetration.

37. The method as claimed in claim 36, further comprising:

using at least one concave recess shape tip engager of said plurality of engagers for an engaging partially into said reinforcing bars; and using at least one pointed tip engager of said plurality of engagers for an engaging substantially into said reinforcing bars.

38. The method as claimed in claim 37 further comprising:

using at least one blunt tip engager of said plurality of engagers for an engaging onto said reinforcing bars.

39. The method as claimed in claim 36 further comprising:

gripping said reinforcing bars using at least one recessed gripping surface, said at least one recessed gripping surface being formed on at least one face of an inner surface of said tubular body, said at least one recessed gripping surface extending longitudinally on said at least one face; and coupling said reinforcing bars using said at least one recessed gripping surface in response to an engaging of said reinforcing bars by said plurality of engagers.

40. The method as claimed in claim 36 wherein said coupling device comprises a substantially circular cross-sectional configuration wherein said inner surface comprises a single longitudinally extending face.

* * * * *

UNITED STATES PATENT AND TRADEMARK OFFICE
CERTIFICATE OF CORRECTION

PATENT NO. : 7,093,402 B2 Page 1 of 1
APPLICATION NO. : 10/974492
DATED : August 22, 2006
INVENTOR(S) : Ian Hopwood It is certified that error appears in the above-identified patent and that said Letters Patent is hereby corrected as shown below:

On The Title Page,
Related U.S. Application Data (Field 63), line 2, replace "Nov. 13, 2003." with --Jan. 30, 2003.--.

Signed and Sealed this

Thirty-first Day of October, 2006

JON W. DUDAS
*Director of the United States Patent and Trademark Office*